US012632457B2

(12) United States Patent
Lee et al.

(10) Patent No.: US 12,632,457 B2
(45) Date of Patent: May 19, 2026

(54) CONTEXTUALIZED TOKEN RETRIEVER

(71) Applicant: Google LLC, Mountain View, CA (US)

(72) Inventors: Jinhyuk Lee, San Francisco, CA (US); Zhuyun Dai, Sunnyvale, CA (US); Sai Meher Karthik Duddu, Mountain View, CA (US); Tao Lei, Sunnyvale, CA (US); Iftekhar Naim, Los Gatos, CA (US); Ming-Wei Chang, Redmond, WA (US); Yuzhe Zhao, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/005,388

(22) Filed: Dec. 30, 2024

(65) Prior Publication Data

US 2025/0217373 A1     Jul. 3, 2025

Related U.S. Application Data

(60) Provisional application No. 63/615,757, filed on Dec. 28, 2023.

(51) Int. Cl.
G06F 16/2457          (2019.01)
(52) U.S. Cl.
CPC .............................. G06F 16/24578 (2019.01)
(58) Field of Classification Search
CPC ................................................ G06F 16/24578
See application file for complete search history.

(56) References Cited

U.S. PATENT DOCUMENTS

2025/0190481 A1 *   6/2025   Shrestha ............. G06F 16/3347

OTHER PUBLICATIONS

Arabzadeh et al., "Shallow pooling for sparse labels," Information Retrieval Journal, Jul. 2022, 25(4):365-385.
Bajaj et al., "MS Marco: A Human Generated Machine Reading COmprehension Dataset," CoRR, Submitted on Oct. 31, 2018, arXiv:1611.09268v3, 11 pages.
Chen et al., "Salient Phrase Aware Dense Retrieval: Can a Dense Retriever Imitate a Sparse One?," CoRR, Submitted on Oct. 13, 2021, arXiv:2110.06918v1, 11 pages.
Dai et al., "Promptagator: Few-shot Dense Retrieval From 8 Examples," CoRR, Submitted on Sep. 23, 2022, arXiv:2209.11755v1, 21 pages.
Devlin et al., "Bert: Pre-training of Deep Bidirectional Transformers for Language Understanding," CoRR, Submitted on Oct. 11, 2018, arXiv:1810.04805v1, 14 pages.
Formal et al., "Splade v2: Sparse Lexical and Expansion Model for Information Retrieval," CoRR, Submitted on Sep. 21, 2021, arXiv:2109. 10086v1, 6 pages.

(Continued)

*Primary Examiner* — Hau H Hoang
(74) *Attorney, Agent, or Firm* — Fish & Richardson P.C.

(57)          ABSTRACT

Methods, systems, and apparatuses, including computer programs encoded on computer storage media, for identifying relevant documents to a query by using only retrieved token vectors of candidate documents rather than all token vectors of the documents. That is, by using only retrieved token vectors of candidate documents rather than all token vectors of the documents, the described techniques dramatically increase the speed and accuracy of identifying relevant documents to a query.

20 Claims, 6 Drawing Sheets

(56) References Cited

OTHER PUBLICATIONS

Gao et al., "Coil: Revisit Exact Lexical Match in Information Retrieval with Contextualized Inverted List," Paper, Presented at the Proceedings of the 2021 Conference of the North American Chapter of the Association for Computational Linguistics: Human Language Technologies, Virtual Event, Jun. 6-11, 2021, pp. 3030-3042.

Gemini Team et al., "Gemini: A Family of Highly Capable Multimodal Models," CoRR, Submitted on Dec. 19, 2023, arXiv:2312.11805v1, 62 pages.

Guo et al., "Accelerating Large-Scale Inference with Anisotropic Vector Quantization," Paper, Presented at the Proceedings of the 37th International Conference on Machine Learning, Vienna, Austria, Jul. 13-18, 2020; PMLR, 2020, 119:1-10.

Humeau et al., "Poly-encoders: Architectures and Pre-training Strategies for Fast and Accurate Multi-sentence Scoring," CoRR, Submitted on Mar. 25, 2020, arXiv:1905.01969v4, 14 pages.

Humeau et al., "Poly-encoders: Architectures and Pre-training Strategies for Fast and Accurate Multi-sentence Scoring," Paper, Presented at the 8th International Conference on Learning Representations, Virtual Event, Apr. 26-May 1, 2020, 14 pages.

Izacard et al., "Unsupervised Dense Information Retrieval with Contrastive Learning," Transactions on Machine Learning Research, Aug. 2022, 21 pages.

Karpukhin et al., "Dense Passage Retrieval for Open-Domain Question Answering," CoRR, Submitted on Apr. 10, 2020, arXiv:2004.04906v1, 10 pages.

Khattab et al., "ColBERT: Efficient and Effective Passage Search via Contextualized Late Interaction over BERT," CoRR, Submitted on Jun. 4, 2020, arXiv:2004.12832v2, 10 pages.

Khattab et al., "ColBERT: Efficient and Effective Passage Search via Contextualized Late Interaction over BERT," Paper, Presented at the Proceedings of the 43rd International ACM SIGIR Conference on Research and Development in Information Retrieval (SIGIR '20), Virtual Event, Jul. 25-30, 2020, pp. 39-48.

Lee et al., "Latent Retrieval for Weakly Supervised Open Domain Question Answering," Paper, Presented at the Proceedings of the 57th Annual Meeting of the Association for Computational Linguistics, Florence, Italy, Jul. 28-Aug. 2, 2019, pp. 6086-6096.

Li et al., "Citadel: Conditional Token Interaction via Dynamic Lexical Routing for Efficient and Effective Multi-Vector Retrieval," CoRR, Submitted on Nov. 18, 2022, arXiv:2211.10411v1, 14 pages.

Li et al., "Citadel: Conditional Token Interaction via Dynamic Lexical Routing for Efficient and Effective Multi-Vector Retrieval," Paper, Presented at the Proceedings of the 61st Annual Meeting of the Association for Computational Linguistics vol. 1: Long Papers, Toronto, Canada, Jul. 9-14, 2023, pp. 11891-11907.

Luan et al., "Sparse, Dense, and Attentional Representations for Text Retrieval," Transactions of the Association for Computational Linguistics, Apr. 2021, 9:329-345.

Macdonald et al., "On Approximate Nearest Neighbour Selection for Multi-Stage Dense Retrieval," Paper, Presented at the Proceedings of the 30th ACM International Conference on Information and Knowledge Management (CIKM '21), Virtual Event, Nov. 1-5, 2021, 5 pages.

Ni et al., "Large Dual Encoders Are Generalizable Retrievers," Paper, Presented at the Proceedings of the 2022 Conference on Empirical Methods in Natural Language Processing, Abu Dhabi, United Arab Emirates, Dec. 7-11, 2022, pp. 9844-9855.

Qian et al., "Multi-Vector Retrieval as Sparse Alignment," CoRR, Submitted on Nov. 2, 2022, arXiv:2211.01267v1, 19 pages.

Qu et al., "RocketQA: An Optimized Training Approach to Dense Passage Retrieval for Open-Domain Question Answering," Paper, Presented at the Proceedings of the 2021 Conference of the North American Chapter of the Association for Computational Linguistics: Human Language Technologies, Virtual Event, Jun. 6-11, 2021, pp. 5835-5847.

Raffel et al., "Exploring the Limits of Transfer Learning with a Unified Text-to-Text Transformer," CoRR, Submitted on Jul. 28, 2020, arXiv:1910.10683v3, 67 pages.

Raffel et al., "Exploring the Limits of Transfer Learning with a Unified Text-to-Text Transformer," Journal of Machine Learning Research, Jun. 2020, 21(140):1-67.

Ram et al., "Learning to Retrieve Passages without Supervision," Paper, Presented at the Proceedings of the 2022 Conference of the North American Chapter of the Association for Computational Linguistics: Human Language Technologies, Seattle, WA, Jul. 10-15, 2022, pp. 2687-2700.

Ram et al., "Maximum Inner-Product Search Using Cone Trees," Paper, Presented at the Proceedings of the 18th ACM SIGKDD international conference on Knowledge discovery and data mining (KDD'12), Beijing, China, Aug. 12-16, 2012, 9 pages.

Sachan et al., "Improving Passage Retrieval with Zero-Shot Question Generation," CoRR, Submitted on Apr. 15, 2022, arXiv:2204.07496v1, 13 pages.

Sachan et al., "Questions Are All You Need to Train a Dense Passage Retriever," CoRR, Submitted on Jun. 21, 2022, arXiv:2206.10658v1, 13 pages.

Santhanam et al., "ColBERTv2: Effective and Efficient Retrieval via Lightweight Late Interaction," CoRR, Submitted on Jul. 10, 2022, arXiv:2112.01488v3, 20 pages.

Santhanam et al., "ColBERTv2: Effective and Efficient Retrieval via Lightweight Late Interaction," Paper, Presented at the Proceedings of the 2022 Conference of the North American Chapter of the Association for Computational Linguistics: Human Language Technologies, Seattle, WA, Jul. 10-15, 2022, pp. 3715-3734.

Santhanam et al., "Plaid: An Efficient Engine for Late Interaction Retrieval," CoRR, Submitted on May 19, 2022, arXiv:2205.09707v1, 10 pages.

Santhanam et al., "Plaid: An Efficient Engine for Late Interaction Retrieval," Paper, Presented at the Proceedings of the 31st ACM International Conference on Information and Knowledge Management (CIKM '22), Atlanta, GA, Oct. 17-21, 2022, pp. 1747-1756.

Sciavolino et al., "Simple Entity-Centric Questions Challenge Dense Retrievers," Paper, Presented at the Proceedings of the 2021 Conference on Empirical Methods in Natural Language Processing, Virtual Event, Nov. 7-11, 2021, pp. 6138-6148.

Shen et al., "Learning Binary Codes for Maximum Inner Product Search," Paper, Presented at the IEEE International Conference on Computer Vision (ICCV), Santiago, Chile, Dec. 7-13, 2015, pp. 4148-4156 (Author Manuscript).

Shrivastava et al., "Asymmetric LSH (ALSH) for Sublinear Time Maximum Inner Product Search (MIPS)," Paper, Presented at the 28th Conference on Neural Information Processing Systems, Montreal, Canada, Dec. 8-13, 2014; Advances in Neural Information Processing Systems, Dec. 2014, 27:1-9.

Shrivastava et al., "Improved Asymmetric Locality Sensitive Hashing (ALSH) for Maximum Inner Product Search (MIPS)," Paper, Presented at the Proceedings of the 31st Conference on Uncertainty in Artificial Intelligence (UAI'15), Amsterdam, Netherlands, Jul. 12-16, 2015, 10 pages.

Thakur et al., "Beir: A Heterogeneous Benchmark for Zero-shot Evaluation of Information Retrieval Models," CoRR, Submitted on Oct. 21, 2021, arXiv:2104.08663v4, 24 pages.

Thakur et al., "Beir: A Heterogeneous Benchmark for Zero-shot Evaluation of Information Retrieval Models," Paper, Presented at the 35th Conference on Neural Information Processing Systems, Virtual Event, Dec. 6-14, 2021; Advances in Neural Information Processing Systems, Dec. 2021, 34:1-16.

Wang et al., "GPL: Generative Pseudo Labeling for Unsupervised Domain Adaptation of Dense Retrieval," Paper, Presented at the Proceedings of the 2022 Conference of the North American Chapter of the Association for Computational Linguistics: Human Language Technologies, Seattle, WA, Jul. 10-15, 2022, pp. 2345-2360.

Xue et al., "mT5: A Massively Multilingual Pre-trained Text-to-Text Transformer," Paper, Presented at the Proceedings of the 2021 Conference of the North American Chapter of the Association for Computational Linguistics: Human Language Technologies, Virtual Event, Jun. 6-11, 2021, pp. 483-498.

(56)     References Cited

OTHER PUBLICATIONS

Yih et al., "Learning Discriminative Projections for Text Similarity Measures," Paper, Presented at the Proceedings of the Fifteenth Conference on Computational Natural Language Learning, Portland, OR, Jun. 23-24, 2011, pp. 247-256.

Zhang et al., "Making a MIRACL: Multilingual Information Retrieval Across a Continuum of Languages," CoRR, Submitted on Oct. 18, 2022, arXiv:2210.09984v1, 6 pages.

Zhang et al., "Multi-View Document Representation Learning for Open-Domain Dense Retrieval," CoRR, Submitted on Mar. 16, 2022, arXiv:2203.08372v1, 11 pages.

Zhang et al., "Multi-View Document Representation Learning for Open-Domain Dense Retrieval," Paper, Presented at the Proceedings of the 60th Annual Meeting of the Association for Computational Linguistics vol. 1: Long Papers, Dublin, Ireland, May 22-27, 2022, pp. 5990-6000.

* cited by examiner

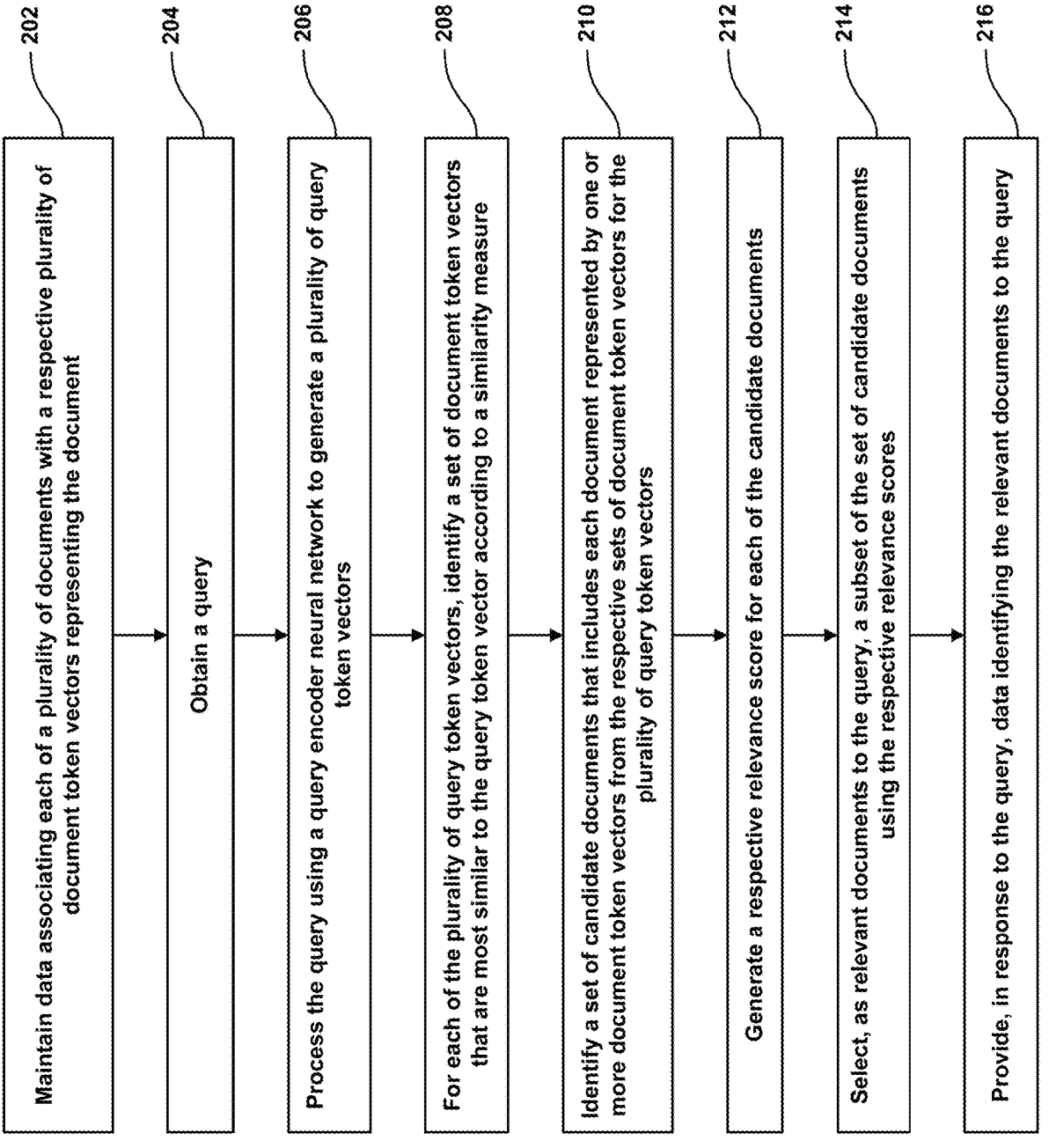

202 — Maintain data associating each of a plurality of documents with a respective plurality of document token vectors representing the document 204 — Obtain a query 206 — Process the query using a query encoder neural network to generate a plurality of query token vectors 208 — For each of the plurality of query token vectors, identify a set of document token vectors that are most similar to the query token vector according to a similarity measure 210 — Identify a set of candidate documents that includes each document represented by one or more document token vectors from the respective sets of document token vectors for the plurality of query token vectors 212 — Generate a respective relevance score for each of the candidate documents 214 — Select, as relevant documents to the query, a subset of the set of candidate documents using the respective relevance scores 216 — Provide, in response to the query, data identifying the relevant documents to the query

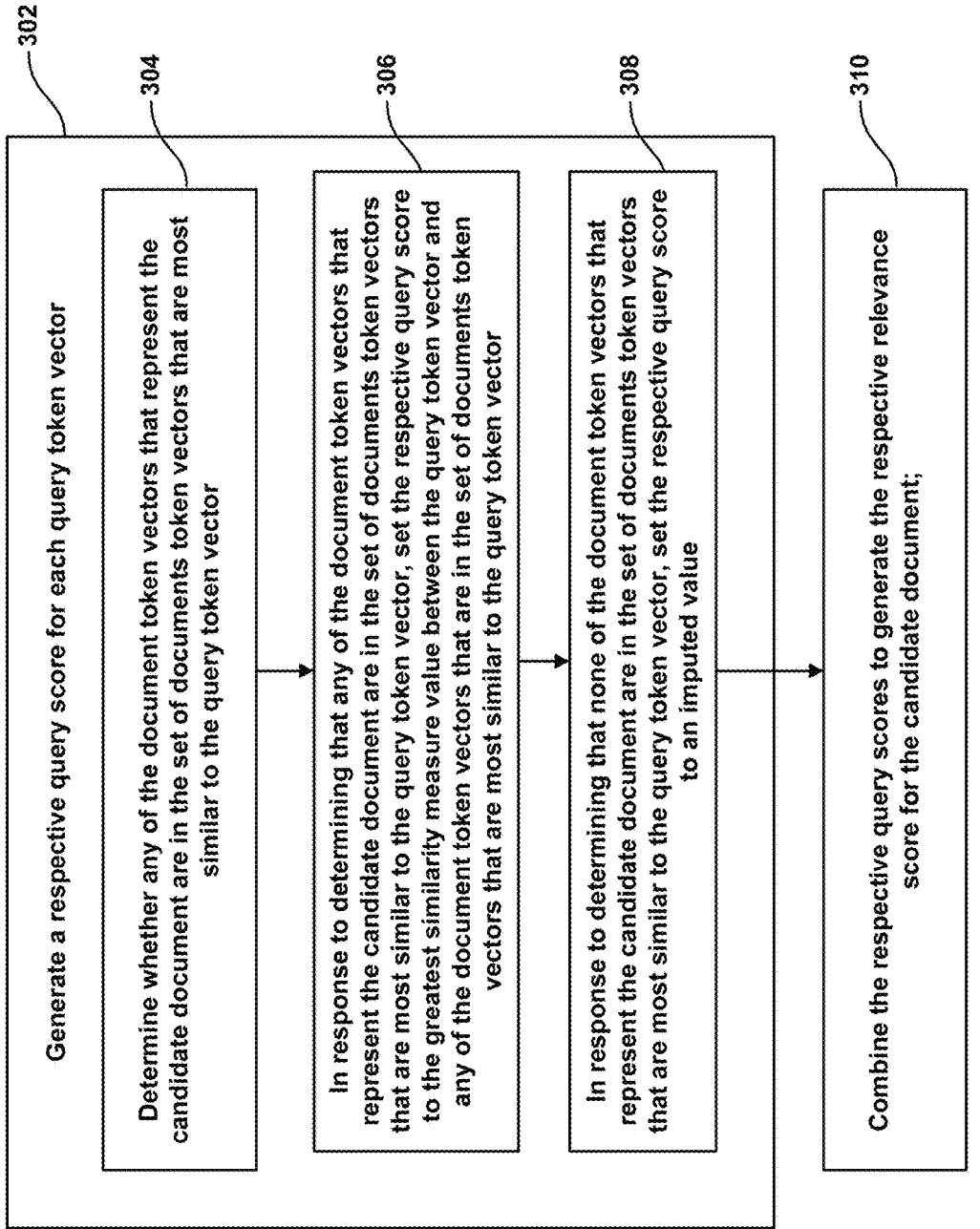

302

Generate a respective query score for each query token vector

304

Determine whether any of the document token vectors that represent the candidate document are in the set of documents token vectors that are most similar to the query token vector

306

In response to determining that any of the document token vectors that represent the candidate document are in the set of documents token vectors that are most similar to the query token vector, set the respective query score to the greatest similarity measure value between the query token vector and any of the document token vectors that are in the set of documents token vectors that are most similar to the query token vector

308

In response to determining that none of the document token vectors that represent the candidate document are in the set of documents token vectors that are most similar to the query token vector, set the respective query score to an imputed value

310

Combine the respective query scores to generate the respective relevance score for the candidate document;

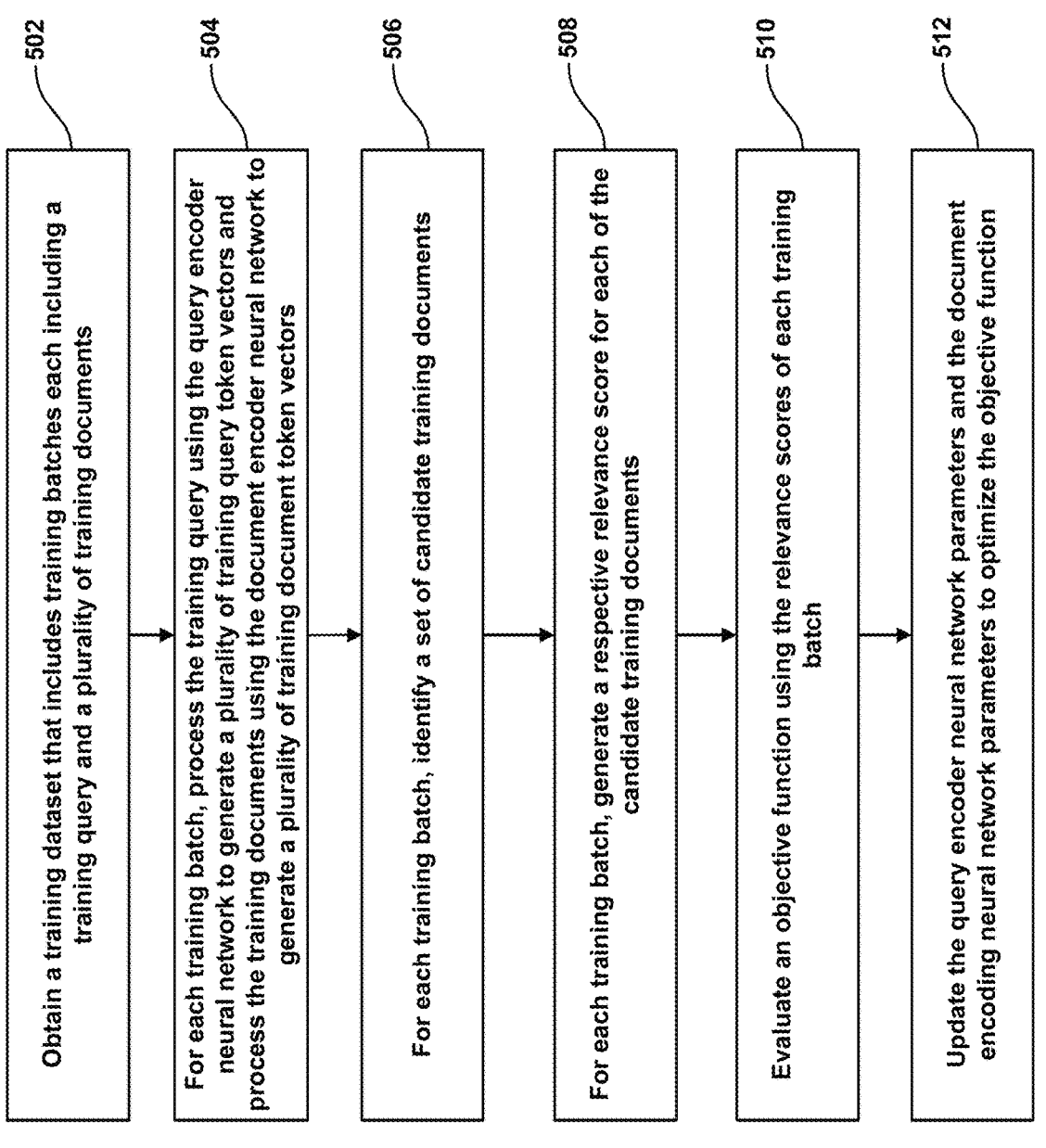

502 — Obtain a training dataset that includes training batches each including a training query and a plurality of training documents 504 — For each training batch, process the training query using the query encoder neural network to generate a plurality of training query token vectors and process the training documents using the document encoder neural network to generate a plurality of training document token vectors 506 — For each training batch, identify a set of candidate training documents 508 — For each training batch, generate a respective relevance score for each of the candidate training documents 510 — Evaluate an objective function using the relevance scores of each training batch 512 — Update the query encoder neural network parameters and the document encoding neural network parameters to optimize the objective function

One Retriever for All

| | MS | AR | TO | FE | CF | SF | CV | NF | NQ | HQ | PQ | SD | DB | QU | Avg |
|---|---|---|---|---|---|---|---|---|---|---|---|---|---|---|---|
| $\text{GTR}_{xxl}$ | 44.2 | 54.0 | 23.3 | 74.0 | 26.7 | 66.2 | 50.1 | 34.2 | 56.8 | 59.0 | 46.7 | 16.1 | 40.8 | 89.2 | 49.1 |
| $\text{TS-ColBERT}_{xxl}$ | 47.3 | 33.8 | 31.0 | 74.2 | 19.7 | 73.1 | 73.8 | 35.2 | 60.5 | 65.2 | 43.5 | 17.1 | 45.0 | 88.0 | 50.8 |
| $\text{XTR}_{xxl}$ | 46.6 | 44.2 | 30.9 | 77.0 | 24.5 | 74.3 | 78.9 | 35.3 | 60.9 | 66.2 | 43.8 | 17.1 | 44.3 | 88.1 | 52.7 |

LoTTE Search

| | Writing | Rec. | Sci. | Tech. | Life. | Pooled |
|---|---|---|---|---|---|---|
| $\text{GTR}_{xxl}$ | 83.9 | 78.0 | 60.0 | 69.5 | 87.4 | 76.0 |
| $\text{XTR}_{xxl}$ | 83.3 | 79.3 | 60.8 | 73.7 | 89.1 | 77.3 |

LoTTE Forum

| | Writing | Rec. | Sci. | Tech. | Life. | Pooled |
|---|---|---|---|---|---|---|
| $\text{GTR}_{xxl}$ | 79.5 | 73.5 | 43.1 | 62.6 | 81.9 | 66.9 |
| $\text{XTR}_{xxl}$ | 83.4 | 78.4 | 51.8 | 64.5 | 83.9 | 71.2 |

CONTEXTUALIZED TOKEN RETRIEVER

CROSS-REFERENCE TO RELATED APPLICATIONS

This application claims priority of U.S. Provisional Application No. 63/615,757, filed Dec. 28, 2023, the contents of which are incorporated herein by reference in their entirety.

BACKGROUND

This specification relates to identifying relevant documents to a query using machine learning models.

As one example, neural networks are machine learning models that employ one or more layers of nonlinear units to predict an output for a received input. Some neural networks include one or more hidden layers in addition to an output layer. The output of each hidden layer is used as input to another layer in the network, e.g., the next hidden layer or the output layer. Each layer of the network generates an output from a received input in accordance with current values of a respective set of weights.

SUMMARY

This specification describes a system implemented as computer programs on one or more computers in one or more locations that identifies relevant documents to a query.

In particular, the system generates relevance scores for documents using only retrieved token vectors of candidate documents rather than all token vectors of the documents to dramatically increase the speed and accuracy of identifying relevant documents to a query.

Particular embodiments of the subject matter described in this specification can be implemented so as to realize one or more of the following advantages.

The accuracy and efficiency of identifying relevant documents to a query are largely affected by how expressive representations over queries and documents are and whether a document can be efficiently retrieved and scored. Many conventional methods are designed to capture token-level interactions between queries and documents (i.e., pairs of interactions between query tokens and document tokens that constitute a query and a document respectively are captured instead of only an interaction between the entire query and the entire document) and, hence, have high expressivity, which can result in high accuracy. But these same methods often are resource-intensive because they have high computational complexity (i.e., require many computational operations to evaluate token-level interactions) and have high computational memory requirements (i.e., require large computational memory availability to evaluate token-level interactions), resulting in low efficiency. Additionally, there are instances where these conventional methods are resource-intensive but fail to deliver the accuracy that the resource cost was meant to justify. That is, these conventional methods can be both resource intensive and fail to identify relevant documents to the query.

This specification describes a system that can address the aforementioned challenges. That is, this specification describes techniques that achieve high accuracy while also achieving high efficiency for identifying relevant documents to a query. The techniques described in this specification increase the speed and accuracy of identifying relevant documents to a query by generating relevance scores for documents using only retrieved token vectors of candidate documents rather than all token vectors of the documents.

For example, when the described techniques of this specification are applied to BEIR (i.e., 18 diverse datasets representing 9 information retrieval tasks [i.e., fact-checking, question-answering, bio-medical retrieval, news retrieval, argument retrieval, duplicate question retrieval, citation-prediction, tweet retrieval, entity retrieval]) the techniques achieve equal or greater accuracy at identifying relevant documents to a query compared to conventional methods, while also reducing the required FLOPS (floating point operations per second) by over a factor of 4000.

The details of one or more embodiments of the subject matter of this specification are set forth in the accompanying drawings and the description below.

Other features, aspects, and advantages of the subject matter will become apparent from the description, the drawings, and the claims.

BRIEF DESCRIPTION OF THE DRAWINGS

FIG. 2 is a flow diagram of an example process for generating data identifying the relevant documents to the query.

FIG. 3 is a flow diagram of an example process for generating a respective relevance score for a candidate document.

FIG. 5 is a flow diagram of an example process for training the query and document encoder neural networks.

FIG. 6 is an example of the performance of the described techniques.

Like reference numbers and designations in the various drawings indicate like elements.

DETAILED DESCRIPTION

Figure 1:
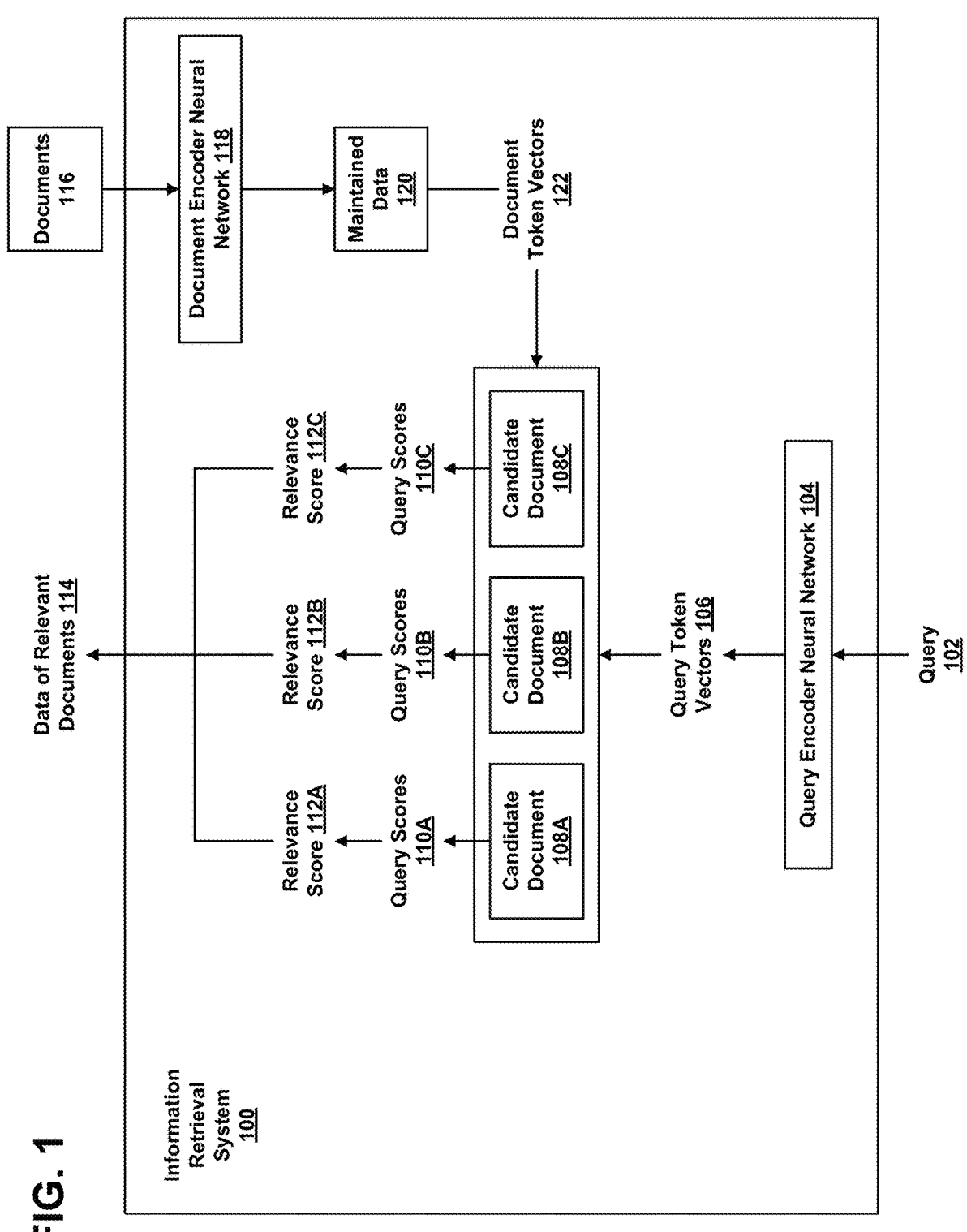
FIG. 1 shows an example information retrieval system.

FIG. 1 shows an example information retrieval system 100. The information retrieval system 100 is an example of a system implemented as computer programs on one or more computers in one or more locations, in which the systems, components, and techniques described below can be implemented.

The system 100 is a system that receives a query 102 and, in response, provides data 114 identifying the relevant documents to the query from a set of documents 116.

Generally, the query 102 represents the desired document a user seeks. The query 102 can be, e.g., a natural language query, an image query, a multi-modal query, i.e., a query that includes multiple modalities of data, e.g., both text and images or both text and audio, or a query in a structured data format.

Furthermore, the documents 116 can be any appropriate electronic content. For example, the documents 116 can include any of text documents, individual text segments extracted from text documents, images, videos, web pages, audio data, multi-modal documents that include two different modalities of data, e.g., images and text, software applications, and so on.

In some cases, all of the documents 116 are the same type of document while in other implementations different documents 116 are different types of documents.

The data 114 identifying the relevant documents to the query can include document identifiers (e.g., URLs, files paths, file names, etc.). In some cases, the data 114 includes respective relevance scores for each relevant document.

In particular, the system 100 maintains data 120 associating each of a plurality of documents 116 with a respective plurality of document token vectors 122 representing the document.

Generally, the system 100 processes each document 116 using a document encoder neural network 118 to generate the respective plurality of document token vectors 122 representing the document.

Generally, the document encoder neural network 118 can be any of a variety of neural networks that processes a document to generate a sequence of document token vectors for the document.

That is, the system 100 or the document encoder neural network 118 can process a document to generate a sequence of document tokens (i.e., tokenize the document, e.g., using sentence piece tokenizer or the initial layer of the document encoder neural network 118) so that the document encoder neural network 118 can further process the document tokens to generate document token vectors (i.e., embeddings of the document tokens). Some examples of neural network architectures that can be used to process document tokens to generate document token vectors include transformers, recurrent neural networks (e.g., long short-term memory networks, and gated recurrent units), and convolution neural networks.

The system 100 then obtains a query 102. The system 100 can obtain the query 102 from a user or another system.

For example, the system 100 can obtain a query 102 from a user interface on an end-user device (e.g., a search entry entered into a search bar by a user).

As another example, the system 100 can obtain a query 102 from a server running an application (e.g., through an API call initiated by the application).

The system 100 processes the query 102 using a query encoder neural network 104 to generate a plurality of query token vectors 106.

Generally, the query encoder neural network 104 can be any of a variety of neural networks that processes a query to generate a sequence of query token vectors for the query. That is, the system 100 or the query encoder neural network 104 can process a query to generate a sequence of query tokens (i.e., tokenize the query, e.g., using sentence piece tokenizer or the initial layer of the query encoder neural network 104) so that the query encoder neural network 104 can further processes the query tokens to generate query token vectors (i.e., embeddings of the query tokens). Some examples of neural network architectures that can be used to process query tokens to generate query token vectors include transformers, recurrent neural networks (e.g., long short-term memory networks, and gated recurrent units), and convolution neural networks.

In some cases, the query encoder neural network 104 and the document encoder neural network 118 are the same neural network. In some other cases, the query encoder neural network 104 and the document encoder neural network 118 are different neural networks that have been trained jointly to generate token vectors in the same embedding space. Training will be described in more detail below.

For each of the plurality of query token vectors 106, the system 100 identifies a set of document token vectors that are most similar to the query token vector according to a similarity measure.

For example, the similarity measure can be the cosine similarity measure. That is, for each of the plurality of query token vectors 106, the system 100 computes the cosine similarity measure value between the query token vector and each of the document token vectors 122. Then the system

100 identifies the document token vectors with the highest respective cosine similarity measure value with the query token vector as the set of document token vectors that are most similar to the query token vector.

As another example, the similarity measure can be the Euclidean distance, with lower values indicating higher similarity. That is, for each of the plurality of query token vectors 106, the system 100 computes the Euclidean distance between the query token vector and each of the document token vectors 122. Then the system 100 identifies the document token vectors with the highest respective similarity measure value with the query token vector (i.e., the document token vectors with the lowest Euclidean distance to the query token vector) as the set of document token vectors that are most similar to the query token vector.

The system 100 then identifies a set of candidate documents 108A-C that includes each document represented by one or more document token vectors from the respective sets of document token vectors for the plurality of query token vectors 104. That is, the candidate documents 108A-C are the union of the source documents of the sets of document token vectors and make up an initial candidate document set that the system 100 will further process to determine the data 114 identifying relevant documents to the query.

The candidate documents 108A-C represent the documents most likely to be relevant to the query 102. If there are n query token vectors and the system 100 selects the k most similar document token vectors for each set of document token vectors, there can be up to nk total number of candidate documents if each token belongs to a unique document.

Next the system 100 generates a respective relevance score for each of the candidate documents 108A-C.

In particular, the system 100, for a candidate document (e.g., candidate document 108A), generates a respective query score for each query token vector (e.g., query scores 110A for candidate document 108A).

To generate a respective query score for a given query token vector, the system 100 determines whether any of the document token vectors 122 that represent the candidate document (e.g., 108A) are in the set of documents token vectors that are most similar to the query token vector.

In response to determining that any of the document token vectors that represent the candidate document are in the set of documents token vectors that are most similar to the query token vector, the system 100 sets the respective query score to the greatest similarity measure value between the query token vector and any of the document token vectors that are in the set of documents token vectors that are most similar to the query token vector.

But, in response to determining that none of the document token vectors that represent the candidate document are in the set of documents token vectors that are most similar to the query token vector, the system 100 sets the respective query score to an imputed value.

For example, for a query token vector $Q^i$ (where the superscript i is the sequence index), if none of the document token vectors are in the set of documents token vectors, then the system 100 sets the respective query score to the imputed value $m^i$. Conversely, if the cosine similarity value V is the greatest similarity measure value between the query token vector $Q^i$ and any of the document token vectors, then the system 100 sets the respective query score to be V.

In some cases, the system 100 pre-defines the imputed value. That is, the system 100 pre-defines the imputed value, e.g., as zero, 0.2 or any other positive real number.

In some other cases, the system 100 determines the imputed value using the similarity measure values between the query token vector and all document token vectors in the set of document token vectors most similar to the query token vector. For example, the system 100 can determine the imputed value to be the least similarity measure value (i.e., the smallest magnitude similarity value) from among all the similarity measure values between the query token vector and all document token vectors in the set of document token vectors most similar to the query token vector.

As a particular example, if the similarity measure values, e.g., cosine similarity values, between the query token vector and all document token vectors in the set of document token vectors most similar to the query token vector are 0.2, 0.9, and 0.5, the system 100 determines the least similarity measure value to be 0.2.

Further details of generating a respective query score are described below.

The system 100 then combines the respective query scores (e.g., query scores 110A) to generate the respective relevance score (e.g., relevance score 112A for query scores 110A) for the candidate document (e.g., candidate document 108A).

For example, the system 100 sums the respective query scores and divides the sum by the number of query scores.

After the system 100 generates the respective relevance score 112A-C for each of the candidate documents 108A-C, the system 100 selects, as relevant documents to the query, a subset of the set of candidate documents 112A-C using the respective relevance scores.

For example, the system 100 can select the candidate documents 110A-C whose respective relevance scores 112A-C exceed a threshold.

Further details of selecting candidate documents are described below.

Then, the system provides data 114 identifying the relevant documents in response to the query 102. For example, if the system 100 received the query 102 from a user through a user end-device interface, the system 100 can provide the data 114 to the user through the user end-device interface.

The data, for example, can be file paths to electronic content, unique file identifiers to electronic content, URLs, document titles, any document metadata (e.g., creation date, author, etc.), or any combination of these.

Further details of providing data identifying the relevant documents to the query are described below.

While FIG. 1 shows only three candidate documents 108A-C, three respective sets of query scores 110A-C, and three respective relevance scores 112A-C, in practice the system 100 can include any number of candidate documents, respective sets of query scores, and respective relevance scores.

FIG. 2 is a flow diagram of an example process 200 for generating data identifying the relevant documents to the query. For convenience, the process 200 will be described as being performed by a system of one or more computers located in one or more locations. For example, a computer system, e.g., the computer system 100 of FIG. 1, appropriately programmed in accordance with this specification, can perform the process 100.

The system maintains data associating each of a plurality of documents with a respective plurality of document token vectors representing the document (step 202). Each document token vector corresponds to a numerical representation (i.e., a vector of numbers) of a piece of information (e.g., text, portion of image, audio clip, video frames, etc.) of a document (i.e., any appropriate electronic content, e.g., text document, image, audio, video, etc.), and these representations capture the semantic meaning of what is being embedded.

As described above, the documents can be any appropriate electronic content that, in some cases, are all the same type of document or, in other cases, are not all the same type of document. That is, the documents may all be the same modality (e.g., all documents are text documents, or all documents are images), or the documents may contain multi-modal data within documents (e.g., a document can contain both text and images), across documents (e.g., for a set of documents, some documents can contain only text, while other documents contain only images), or both (e.g., for a set of documents, some documents contain text and images, and others contain audio, text, and images).

As described above, generally, the system processes each of the plurality of documents using a document encoder neural network to generate the respective plurality of document token vectors representing the document, and the document encoder neural network can be any appropriate neural network that processes a document to generate a sequence of document token vectors for the document.

For example, the document encoder neural network can have the architecture of pre-trained neural network models, such as BERT (as described in arXiv:1810.04805), T5 (as described in arXiv: 1910.10683), or Gemini (as described in arXiv:2312.11805), e.g., the document encoder neural network can be initialized as one of these pre-trained models and then later fine-tuned. The neural network architectures of all these neural networks are capable of processing documents (text, image, video, audio, etc.) to generate respective plurality of document token vectors representing the document.

In some cases, the system can maintain the data by indexing the respective document token vectors in an index database and then search the document token vectors using a search technique by searching the indexed document token vectors in the index database using the search technique. This allows the system to later perform identifying a set of document token vectors that are most similar to the query token vector for any given query token vector (and, as a result, any given query) even when the number of document token vectors is large.

The system obtains a query (step 204). As described above, the query can be any appropriate electronic content (just as the document can be) but generally, represents information intended to be used to retrieve relevant maintained documents.

For example, the query can include natural language text that represents information used to retrieve documents.

As a particular example, the natural language text could be keywords, e.g., "gladiators in ancient Rome", and the text documents can include information relevant to the keywords, e.g., articles describing archaeological findings of the lifestyle of gladiators who fought in the colosseum in Rome.

As another particular example, the natural language text can be a question, e.g., "How does one train a dog to rollover?", and the retrieved documents can be those that include information to answer the question, e.g., text guides of how to train animals.

As another particular example, the natural language text could be a request, e.g., "Show me short stories that have lots of action and are exciting", and the retrieved documents can be those that include information compliant with the request, e.g., a collection of action-packed short stories.

As another example, the query can include audio that represents information used to retrieve documents. The audio can include, just as is the case for natural language text, e.g., questions, keywords, or requests, in the form user voice commands.

Audio queries can also include non-verbal audio data, e.g., audio samples of music or audio of environments. For example, a query can be a snippet of a musical piece, and the retrieved documents can be audio that includes similar tempo, key, artist, etc.

As another example, the query can include images that represents information used to retrieve documents.

As a particular example, a query can be a photo of a national landmark, e.g., the statue of liberty, and the related images can be images from different locations near the national landmark, e.g., various frontal photos of the statue of liberty from different distances.

As another example, the query can include video that represents information used to retrieve documents. For example, a query can include a video of an attempt to build a sandcastle, and the retrieved documents can include video tutorials for sandcastle building, or a video documentary of the history of sandcastle building.

As another example, the query can include multi-modal data that represents information used to retrieve documents.

For example, the query can include both an image and natural language text description. For example, the query can be a request, e.g., "Show me images taken from the crown of this statue", along with an image, e.g., the statue of liberty, and the retrieved images can be photos taken by tourist from the crown of the statue of liberty.

As another example, a query can be a snippet of environmental noise, e.g., rolling ocean waves, and the retrieved documents can be images or videos of a tropical beach.

As described above, the system can obtain a query from a user, e.g., through an interface on an end-user device (e.g., a search entry entered into a search bar by a user), or another system, e.g., the system can obtain a query from a server running an application (e.g., through an API call initiated by the application).

The system processes the query using a query encoder neural network to generate a plurality of query token vectors (step 206).

As described above, the query encoder neural network can be any appropriate neural network that processes a query to generate a sequence of query token vectors for the query.

For example, just as the document encoder neural network can have the neural network architecture of a pre-trained neural network model, so too can a query encoder neural network. That is, the query encoder neural network can have the architecture of, e.g., BERT (as described in arXiv:1810.04805), T5 (as described in arXiv: 1910.10683), or Gemini (as described in arXiv:2312.11805) and, as mentioned above, the architectures enable processing queries of various modalities (e.g., text, image, video, audio, both text and image, etc.) to generate respective query token vectors representing the query.

As described above, in some cases, the query encoder neural network and the document encoder neural network are the same neural network. In other cases, the query encoder neural network and the document encoder neural network are not the same neural network but have similar neural network architectures and are trained jointly, e.g., using the same training datasets, the same training procedures, and optimizing the same objectives. Additionally, in other cases, the query encoder neural network and the document encoder neural network do not have similar neural network architectures.

For each of the plurality of query token vectors, the system identifies a set of document token vectors that are most similar to the query token vector according to a similarity measure (step 208).

The similarity measure can be any appropriate similarity measure between query token vectors and document token vectors. For example, the similarity measure can be the cosine similarity measure (i.e., the cosine angle between two token vectors), the Euclidean distance (i.e., distance between two points represented by token vectors in vector space), or dot product (i.e., the magnitude of overlap between one token vector and the other token vector).

In some implementations, the system performs step 208 in parallel.

For example, the system can use a plurality of parallel processing devices, e.g., CPUs, GPUs, TPUs, or other ASICs, FPGAs, and so on, to identify a set of document token vectors that are most similar in parallel.

As a particular example, the system can use GPUs to concurrently determine the similarity measure, e.g., dot product, between every query token vector and all document token vectors.

As another example, the system can use a combination of hardware and software to perform step 208 in parallel.

As a particular example, the system can use a software framework to asynchronously determine the similarity measures, e.g., the system can use a MapReduce framework (e.g., as employed by Apache Hadoop), to use distributed computing hardware, e.g., multiple compute nodes, to compute similarity measures.

In some cases, the system can use software libraries or compilers that have optimized performance of particular operations or tasks to perform step 208.

For example, the system can use SIMD (single instruction, multiple data) intrinsics, e.g., available on modern C++ compilers to speed up computing similarity measures.

As another example, the system can use BLAS/LAPACK libraries for efficient similarity computations via matrix/matrix multiplication.

As another example, the system can use software libraries (e.g., Faiss) for advance indexing of document token vectors, and advance index searching methods using query token vectors to efficiently reduce the number of similarity measures between query token vectors and document token vectors.

In some cases, the number of document token vectors required in each set of document token vectors of step 208 is a pre-defined number of document token vectors, e.g., 10, 100, or 1000.

The system identifies a set of candidate documents that includes each document represented by one or more document token vectors from the respective sets of document token vectors for the plurality of query token vectors (step 210). As described above, the candidate documents are the union of the source documents of the sets of document token vectors and make up an initial candidate document set that the system will further process to determine the data identifying relevant documents to the query.

For example, the system can determine (or a user can provide the system) a pre-defined integer number of document token vectors each set of document token vectors from step 208 must have and, if there are n query token vectors and the pre-defined number of document token vectors is k', then there can be up to nk' candidate documents if each document token vector comes from a unique document.

The system generates a respective relevance score for each of the candidate documents (step 212).

In order to generate the relevance score for a candidate document, the system generates a query score for each query token vector, and then the system aggregates the query scores to determine the relevance score. For example, the system can determine the relevance score for a candidate document as the average of the respective query scores for the candidate document.

Further details of generating a respective relevance score for a candidate document are described below with reference to FIG. 3 and FIG. 4.

The system selects, as relevant documents to the query, a subset of the set of candidate documents using the respective relevance scores (step 214).

For example, as described above, the system can select the candidate documents whose respective relevance scores exceed a threshold.

As another example, the system can select the candidate documents as those with the highest relevance scores.

As another example, the system can select the candidate documents probabilistically based on their relevance scores.

As a particular example, the system can process each relevance score using the logistic function and select the respective candidate documents according to a probability corresponding to the output of the logistic function.

As another particular example, the system can process each relevance score using the soft-max function and select the respective candidate documents according to a probability corresponding to the output of the soft-max function that uses the relevance score of all candidate documents as input.

The system provides, in response to the query, data identifying the relevant documents to the query (step 216).

As described above, the data can be, e.g., file paths to electronic content, unique file identifiers to electronic content, URLs (i.e., the addresses of a unique resources on the internet), document titles, any document metadata (e.g., creation date, author, etc.), or any combination of these.

For example, the data can be digital object identifiers (i.e., unique and never-changing strings assigned to online articles, books, and other works), or citations (e.g., a modern language associated [MLA] styled citation of a book, or video).

In some cases, the data can include the document. That is, data identifying one or more documents can be the one or more documents. For example, if the data includes a document of natural language text, then the data can include the document of natural language text.

The system can provide the data to a user or another system.

For example, the system can provide the data to a user, e.g., by establishing a network connection with the end-user device. For example, the network can be a cloud-based network, the internet, or a local network.

As another example, the system can provide the data to another system, e.g., by responding to an API request. That is, the system, as an API endpoint over a network, can receive a query from another system and provide, in response, data identifying relevant documents, e.g., in a structured format (e.g., JSON, YAML, etc.), to the other system.

FIG. 3 is a flow diagram of an example process 300 for generating a respective relevance score for a candidate document. For convenience, the process 300 will be described as being performed by a system of one or more computers located in one or more locations. For example, a computer system, e.g., the computer system 100 of FIG. 1, appropriately programmed in accordance with this specification, can perform the process 100.

The system generates a respective query score for each query token vector (step 302). That is, for a candidate document, and for each query token vector, the system performs steps 304-308.

The system determines whether any of the document token vectors that represent the candidate document are in the set of documents token vectors that are most similar to the query token vector (step 304).

For example, the system can perform a membership check, i.e., compare the candidate's document token vectors to those in the set of document token vectors most similar to the query token vector by direct comparison.

In some cases, the set of document token vectors most similar to the query token vector are indexed, and the system can perform quick membership checks of document token vectors.

The system, in response to determining that any of the document token vectors that represent the candidate document are in the set of documents token vectors that are most similar to the query token vector, sets the respective query score to the greatest similarity measure value between the query token vector and any of the document token vectors that are in the set of documents token vectors that are most similar to the query token vector (step 306).

As a particular example, if there are three document token vectors (i.e., $$D_a^e, D_a^f, D_c^g,$$

where subscripts denote document ID and superscripts the token sequence index) in the set of document token vectors that are most similar to the query token vector (i.e., $Q^i$, where the superscript denotes sequence index) with respective similarity measure values with the query token vector of 0.9, 0.5, and 0.2, and the candidate document token vectors $$D_a^e, D_a^f$$

belong to this set of document token vectors, then the system can determine the imputed value as 0.9 because it is the greatest similarity measure value between the query token vector $Q^i$ and any of the document token vectors that are in the set of documents token vectors that are most similar to the query token vector.

The system, in response to determining that none of the document token vectors that represent the candidate document are in the set of documents token vectors that are most similar to the query token vector, sets the respective query score to an imputed value (step 308).

As described above, the system can pre-define the imputed value. For example, the system can pre-define the imputed value to be a real number, e.g., zero, 0.2, 0.5, etc.

Also as described above, the system can determine the imputed value using the similarity measure values between the query token vector and all document token vectors in the set of document token vectors most similar to the query token vector. That is, the imputed value will be the least similarity measure value for the query token vector with a document token vector included in the set of document token vectors most similar to the query token vector.

As a particular example, if there are three document token vectors (i.e., $$D_a^e, D_a^f, D_c^g,$$

where subscripts denote document ID and super scripts the token sequence index) in the set of document token vectors that are most similar to the query token vector (i.e., $Q^i$, where the superscript denotes sequence index) with respective similarity measure values with the query token vector of 0.9, 0.5, and 0.2, but none of candidate document token vectors belong to this set of document token vectors, then the system can determine the imputed value as 0.2 because it is the least similarity measure value for the query token vector $Q^i$ with a document token vector $D_c$ that results in the document token vector $D_c$ being included in the set of document token vectors that are most similar to the query token vector.

Using imputed values makes generating query scores more compute efficient. By avoiding the need to determine a similarity measure between a query token vector and every document token vector to determine a query score, the system reduces computational demands while maintaining high performance, which allows the system to perform well even as the set of potentially relevant documents grows larger. Conventional techniques that explicitly retrieve and use all the candidate document token vectors to determine query scores require orders of magnitude higher compute resources and therefore do not scale as well as the set of potentially relevant documents grows larger.

After generating a respective query score for each query token vector, the system combines the respective query scores to generate the respective relevance score for the candidate document (step 310).

For example, the system sums the respective query scores and divides the sum by the number of query scores.

As other examples of combining the respective query scores to generate the respective relevance score for the candidate document, the system can compute the median, maximum, minimum, or the mode of the respective query scores as the generated relevance score for the candidate document.

Figure 4:
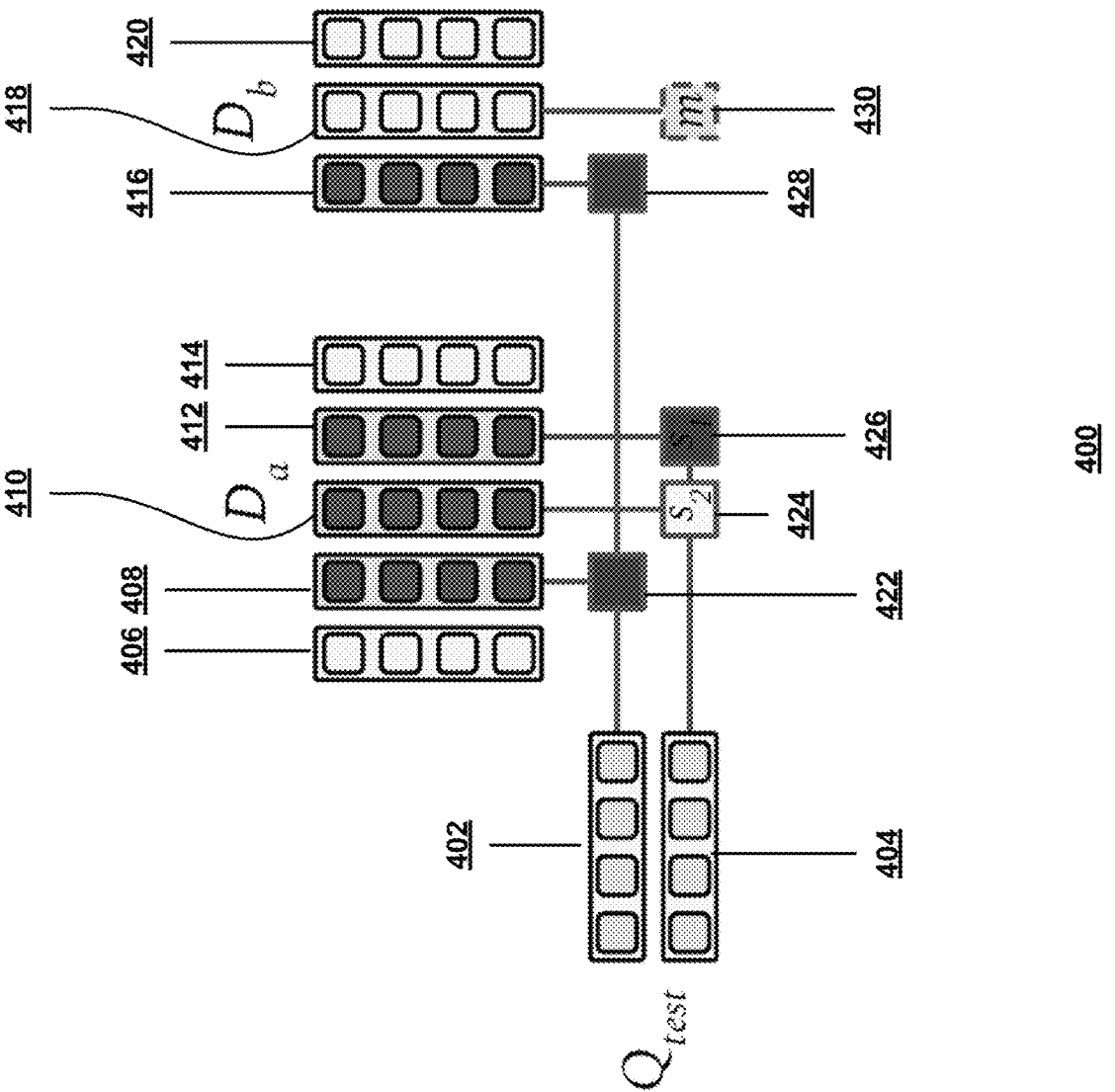
FIG. 4 shows an example schematic diagram illustrating generating a respective relevance score for each of the candidate documents.

FIG. 4 shows an example schematic diagram 400 illustrating generating a respective relevance score for each of the candidate documents.

The example 400 illustrates a query $Q_{test}$ that includes two query token vectors (i.e., a first query token vector $$Q_{test}^1\ 402,$$

and a second query token vector $$Q_{test}^2\ 404,$$

where the superscript denotes the sequence index).
    For the query token $$Q_{test}^1\ 402$$

the system identified a set of document token vectors that are most similar to the query token vector according to a similarity measure (i.e., the set is $$D_a^2\ 408,$$

and $$D_b^1\ 416$$

and the respective similarity measure values are 422, and 428).
    For the query token $$Q_{test}^2\ 404$$

the system identified a set of document token vectors that are most similar to the query token vector according to a similarity measure (i.e., the set is $$D_a^3\ 410,$$

and $$D_a^4\ 412$$

and the respective similarity measure values are 424, and 426).
    The example 400 therefore illustrates two candidate documents (i.e., $D_a$ and $D_b$), where the candidate document $D_a$ includes the sequence of document token vectors $$D_a^1\ 406,\ D_a^2\ 408,\ D_a^3\ 410,\ D_a^4\ 412,\ D_a^5\ 414$$

and the candidate document $D_b$ includes the sequence of document token vectors $$D_b^1\ 416,\ D_b^2\ 418,\ D_b^3\ 420.$$

In particular, to calculate the relevance score for candidate document $D_a$, the system begins by calculating the query score for each query token vector (i.e., $$Q_{test}^1\ 402\ \text{and}\ Q_{test}^2\ 404).$$

For $$Q_{test}^1\ 402,$$

the system determines that the document token vector $$D_a^2 \, 408$$

of the candidate document $D_a$ is in the set of documents token vectors that are most similar to the query token vector. In response, the system determines the query score for $$Q_{test}^1 \, 402$$

to be the similarity measure value 422.

For $$Q_{test}^2 \, 404,$$

the system determines that the document token vectors $$D_a^3 \, 410, \, D_a^4 \, 412$$

of the candidate document $D_a$ is in the set of documents token vectors that are most similar to the query token vector. In response, the system determines the query score for $Q_{test}^2$ 404 to be the similarity measure value 426 because the similarity measure value 426 is the greatest similarity value corresponding to a document token vector that belongs to candidate document $D_a$ and is in the set of documents token vectors that are most similar to the query token vector.

The system then combines the respective query scores to generate the respective relevance score for the candidate document $D_a$. For example, the system can calculate the relevance score as the sum of similarity measure values 422 and 426 divided by two (i.e., the number of query scores).

To calculate the relevance score for candidate document $D_b$, the system begins by calculating the query score for each query token vector (i.e., $$Q_{test}^1 \, 402 \text{ and } Q_{test}^2 \, 404).$$

For $$Q_{test}^1 \, 402,$$

the system determines that the document token vector $$D_b^1 \, 416$$

of the candidate document $D_b$ is in the set of documents token vectors that are most similar to the query token vector. In response, the system determines the query score for $$Q_{test}^1 \, 402$$

to be the similarity measure value 428.

For $$Q_{test}^2 \, 404,$$

the system determines that none of the document token vectors of the candidate document $D_b$ is in the set of documents token vectors that are most similar to the query token vector. In response, the system determines the query score for $$Q_{test}^2 \, 404$$

to be an imputed value 430.

The system then combines the respective query scores to generate the respective relevance score for the candidate document $D_a$. For example, the system can calculate the relevance score as the sum of the similarity measure value 428 and the imputed value 430 divided by two (i.e., the number of query scores).

Generally, the system can use an imputed value to calculate the query score during inference (i.e., when the system is used to retrieve relevant documents using unseen queries), but during training, as will be described below, the system does not use imputed values to calculate the query score for training queries.

Using imputed values for query scores during inference avoids biasing the resulting relevance scores of potentially relevant candidate documents whose document token vectors are in few of the sets of document token vectors that are most similar to the query token vectors (i.e., many query scores are imputations because few of the document token vectors of the candidate document are in the sets of documents token vectors that are most similar to the query token vectors of the query). Without imputation, the relevance scores for these candidate documents can be skewed unpredictably. While conventional techniques may avoid the use of imputations by instead explicitly retrieving and using candidate document token vectors, they tend to be more compute and memory intensive due to the explicit retrieving and use of candidate document token vectors and do not necessarily improve the utility of the resultant relevance score. For training, imputation is not necessary because as training proceeds a relevant document's document token vectors will tend towards being included in most, if not all, of the sets of document token vectors that are most similar to the query token vectors of the query.

FIG. 5 is a flow diagram of an example process 500 for training the query and document encoder neural networks. For convenience, the process 500 will be described as being performed by a system of one or more computers located in one or more locations. For example, a computer system, e.g., the computer system 100 of FIG. 1, appropriately programmed in accordance with this specification, can perform the process 100.

The system obtains a training dataset that includes training batches each including a training query and a plurality of training documents (step 502).

For example, for a training batch, the plurality of training documents can include a determined relevant document and many determined irrelevant documents to the training query.

As another example, for a training batch, the plurality of training documents can include many determined relevant documents and many determined irrelevant documents to the training query.

As another example, for a training batch, the plurality of training documents can include many determined ranked relevant documents and many determined irrelevant documents to the training query.

As another example, for a training batch, the plurality of training documents can include many documents with respective determined probabilities of relevance to the training query.

The system can repeatedly perform the following described example process (steps 504-512) using the training dataset to train the query and document encoder neural networks from scratch, i.e., train from randomly initialized parameters, or fine-tune, i.e., further train.

The system, for each training batch, processes the training query using the query encoder neural network to generate a plurality of training query token vectors and processes the training documents using the document encoder neural network to generate a plurality of training document token vectors (step 504).

The system, for each training batch, identifies a set of candidate training documents (step 506).

In particular, for each training batch, the system and for each of the plurality of training query token vectors, the system identifies a set of training document token vectors that are most similar to the training query token vector according to a similarity measure.

The similarity measure can be any appropriate similarity measure, as described above, between training query token vectors and training document token vectors, e.g., the cosine similarity measure.

In some cases, the number of training document token vectors required in each set of training document token vectors is a pre-defined number of document token vectors, e.g., 10, 100, or 1000. For example, the system can determine (or a user can provide the system) a pre-defined integer number of training document token vectors each set must have. If there are n query token vectors and the pre-defined number of training document token vectors is $k_{train}$, then there can be up to $nk_{train}$ candidate training documents if each training document token vector comes from a unique training document.

Then the system identifies a set of candidate training documents that includes each training document represented by one or more training document token vectors from the respective sets of training document token vectors for the plurality of training query token vectors.

The system, for each training batch, generates a respective relevance score for each of the candidate training documents (step 508).

To generate a relevance score for a candidate training document, the system generates a respective query score for each training query token vector.

To generate a query score, the system first determines whether any of the training document token vectors that represent the candidate training document are in the set of training documents token vectors that are most similar to the training query token vector. Then the system, in response to determining that any of the training document token vectors that represent the candidate training document are in the set of training documents token vectors that are most similar to the training query token vector, sets the respective query score to the greatest similarity measure value between the training query token vector and any of the training document token vectors that are in the set of training documents token vectors that are most similar to the training query token vector. But, in response to determining that none of the training document token vectors that represent the candidate training document are in the set of training documents token vectors that are most similar to the training query token vector, the system does not compute a query score.

The system, in response to determining that none of the training document token vectors are in the set of training documents token vectors most similar to the training query token vector, not computing a query score during training is in direct contrast to the system setting the query score to an imputed value during inference. As described above, during training, imputation of a query score is not necessary because as training proceeds relevant training document token vectors will tend towards being included in most, if not all, of the sets of training document token vectors that are most similar to the training query token vectors of the training query. But during inference, the imputation helps ensure that the relevance scores for relevant candidate documents are not skewed unpredictably when the relevant candidate document has only a few of its document token vectors in the sets of documents token vectors that are most similar to the query token vectors of the query.

After the system generates a query score for each training query token vector, the system combines the respective query scores to generate the respective relevance score for the training candidate document.

For example, the system can sum the respective query scores and divide the sum by the number of respective query scores that was set to the greatest similarity measure value (i.e., the number of query tokens associated with at least one retrieved training document token of the candidate document). In this example, the number of query scores does not necessarily equal to number of query token vectors because the system may not compute some query scores, whereas combining the query scores to generate the respective relevance score for the inference case includes the system computing a query score for every query token vector.

In some cases, when the system does not compute a query score for any training query token vector, the system sets the relevance score to zero.

The system evaluates an objective function using the relevance scores of each training batch (step 510).

Generally, the objective function can include any of a variety of learning to rank loss functions.

For example, the learning to rank loss function can include pointwise loss functions, e.g., mean squared error, cross-entropy loss, and so on, where pointwise loss functions consider the quality of relevance scores independently for each training document.

As another example, the learning to rank loss function can include pairwise loss functions (i.e., loss functions that focus on relative ranking of pairs of training documents within the batch of training documents), e.g., cross-entropy loss over pairs of training documents.

As another example, the learning to rank loss function can include list loss functions (i.e., loss functions that focus on the relative ranking within the batch of training documents or training candidate documents), e.g., listwise maximum likelihood estimation, or softmax cross-entropy loss.

The above described manner of calculating relevance scores in combination with an appropriate learning to rank loss function, e.g., cross-entropy loss, ensures that relevant training documents that did not have their respective training document token vectors included in the sets of training document token vectors for the plurality of training query token vectors (i.e., relevant training documents that the system did not determine to be one of the training candidate documents) incur a high loss because the relevance score for the relevant training document will be zero. In contrast, conventional methods can generate high relevance scores and do not incur a high loss for relevant training documents that the system did not determine to be one of the training candidate documents because their computation of the relance score involves explicitly retrieving all the training document token vectors instead of only using those that have already been retrieved.

The system updates the query encoder neural network parameters and the document encoding neural network parameters to optimize the objective function (step 512). That is, the system determines a gradient with respect to trainable parameters of the query encoder neural network and uses the gradient to update the trainable parameters.

For example, the system can determine the gradient of the objective function with respect to trainable parameters using back propagation and apply an optimizer to the gradient to update the trainable parameters.

The optimizer can be any of a variety of gradient based optimizers, e.g., gradient descent, stochastic gradient descent, Adagrad, RMSprop, Adam, and so on.

In some cases, the query encoder neural network and the document encoding neural network are the same neural network.

In other cases, the query encoder neural network and the document encoding neural network are not the same neural network but are both being trained. In which case, the system determines the gradient of the objective function with respect to trainable parameters of both the query encoder neural network and the document encoder neural network and updates the parameters of both encoders for step 512.

FIG. 6 is an example 600 of the performance of the described techniques.

More specifically, example 600 shows the performance of the described techniques (i.e., $XTR_{xxl}$) compared to other techniques (i.e., $GTR_{xxl}$, $T5\text{-}ColBERT_{xxl}$) in terms of the metric nDCG@10 (i.e., the normalized cumulative discounted gain of the top ten retrieved documents, where the metric ranges from 0 to 100 and the higher the metric the better the performance) for various types of document retrieval across various types datasets. The other technique $GTR_{xxl}$ represents one that is less expressive but computationally cheaper than $XTR_{xxl}$, while the other technique $T5\text{-}ColBERT_{xxl}$ represents one that is similarly expressive but computationally more expensive than $XTR_{xxl}$.

The first column of example 600 (denoted with the heading 'MS') shows the nDCG@10 (e.g., for retrieving passages given a question) on the MS MARCO dataset (i.e., the MAchine Reading Comprehension dataset as described in arXiv:1611.09268). In particular, the first column shows that the described techniques outperform $GTR_{xxl}$ while remaining competitive with $T5\text{-}ColBERT_{xxl}$ and being significantly computationally cheaper than $T5\text{-}ColBERT_{xxl}$.

The top columns of example 600 (except for the first column) shows the nDCG@10 on the BEIR dataset (i.e., the Benchmarking information retrieval dataset as described in arXiv:2104.08663), which consists of a homogenous benchmark for diverse sentence or passage level information retrieval tasks. The described techniques achieve new state-of-the-art performances and significantly outperform single model state-of-the-art.

The bottom columns of example 600 shows the nDCG@10 on the LOTTE dataset (i.e., the Long-Tail Topic-stratified evaluation dataset for information retrieval that features 12 domain-specific search tests, spanning StackExchange communities and using queries from GoogAQ). The described techniques outperform the other technique (i.e., $GTR_{xxl}$) across all tasks with the exception of LoTTE Search task in the writing domain, where performance is comparable.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for efficiently identifying relevant documents to a query, the method comprising:

maintaining data associating each of a plurality of documents with a respective plurality of document token vectors representing the document;

obtaining the query;

processing the query using a query encoder neural network to generate a plurality of query token vectors;

for each of the plurality of query token vectors, identifying a set of document token vectors that are most similar to the query token vector according to a similarity measure;

identifying a set of candidate documents that includes each document represented by one or more document token vectors from the respective sets of document token vectors for the plurality of query token vectors;

generating a respective relevance score for each of the candidate documents, comprising:

generating a respective query score for each query token vector, comprising:

for a first query token vector, determining that one or more of the document token vectors that represent the candidate document are in the set of document token vectors that are most similar to the first query token vector; and in response to determining that one or more of the document token vectors that represent the candidate document are in the set of document token vectors that are most similar to the first query token vector, setting the respective query score to the greatest similarity measure value between the first query token vector and any of the document token vectors that are in the set of document token vectors that are most similar to the first query token vector;

for a second query token vector, determining that none of the document token vectors that represent the candidate document are in the set of document token vectors that are most similar to the second query token vector;

in response to determining that none of the document token vectors that represent the candidate document are in the set of document token vectors that are most similar to the second query token vector, setting the respective query score to an imputed value; and combining the respective query scores to generate the respective relevance score for the candidate document;

selecting, as relevant documents to the query, a subset of the set of candidate documents using the respective relevance scores; and providing, in response to the query, data identifying the relevant documents to the query.

2. The method of claim 1, further comprising:

processing each document using a document encoder neural network to generate the respective plurality of document token vectors representing the document.

3. The method of claim 2, wherein the query encoder neural network and the document encoder neural network are the same neural network.

4. The method of claim 1, wherein the imputed value is the least similarity measure value between the second query token vector and any of the document token vectors in the set of document token vectors that are most similar to the second query token vector according to a similarity measure.

5. The method of claim 4, wherein the similarity measure is the cosine similarity.

6. The method of claim 1, wherein combining the respective query scores to generate the respective relevance score for the candidate document comprises:

summing the respective query scores; and dividing the sum by the number query scores.

7. The method of claim 1, wherein selecting, as relevant documents to the query, the subset of the set of candidate documents using the respective relevance scores comprises:

selecting the subset of the candidate documents with the largest relevance scores.

8. The method of claim 1, further comprising:

obtaining a training dataset comprising training batches each comprising a training query and a plurality of training documents;

for each training batch, processing the training query using the query encoder neural network to generate a plurality of training query token vectors;

processing the training documents using a document encoder neural network to generate a plurality of training document token vectors;

for each of the plurality of training query token vectors, identifying a set of training document token vectors that are most similar to the training query token vector according to a similarity measure;

identifying a set of candidate training documents that includes each training document represented by one or more training document token vectors from the respective sets of training document token vectors for the plurality of training query token vectors;

generating a respective relevance score for each of the candidate training documents, comprising:

generating a respective query score for each training query token vector, comprising:

for a first training query token vector, determining whether one or more of the training document token vectors that represent the candidate training document are in the set of training document token vectors that are most similar to the first training query token vector; and in response to determining that one or more of the training document token vectors that represent the candidate training document are in the set of training document token vectors that are most similar to the first training query token vector, setting the respective query score to the greatest similarity measure value between the first training query token vector and any of the training document token vectors that are in the set of training document token vectors that are most similar to the first training query token vector; and combining the respective query scores to generate the respective relevance score for the training candidate document;

evaluating an objective function using the relevance scores of each training batch; and training the query encoder neural network and the document encoder neural network to optimize the objective function.

9. The method of claim 8, wherein the query encoder neural network and the document encoder neural network are the same neural network.

10. The method of claim 8, further comprising:

for a second training query token vector, determining whether one or more of the training document token vectors that represent the candidate training document are in the set of training document token vectors that are most similar to the second training query token vector; and in response to determining that none of the training document token vectors that represent the candidate training document are in the set of training document token vectors that are most similar to the second training query token vector, setting the respective query score to zero.

11. The method of claim 8, wherein combining the respective query scores to generate the respective relevance score for the training candidate document:

summing the respective query scores; and dividing the sum by the number of respective query scores that was set to the greatest similarity measure value.

12. The method of claim 8, wherein the plurality of training documents comprises one or more relevant documents and a plurality of irrelevant documents.

13. A system comprising one or more computers and one or more storage devices storing instructions that when executed by the one or more computers cause the one or more computer to perform operations comprising:

maintaining data associating each of a plurality of documents with a respective plurality of document token vectors representing the document;

obtaining the query;

processing the query using a query encoder neural network to generate a plurality of query token vectors;

for each of the plurality of query token vectors, identifying a set of document token vectors that are most similar to the query token vector according to a similarity measure;

identifying a set of candidate documents that includes each document represented by one or more document token vectors from the respective sets of document token vectors for the plurality of query token vectors;

generating a respective relevance score for each of the candidate documents, comprising:

generating a respective query score for each query token vector, comprising:

for a first query token vector, determining that one or more of the document token vectors that represent the candidate document are in the set of document token vectors that are most similar to the query token vector; and in response to determining that one or more of the document token vectors that represent the candidate document are in the set of document token vectors that are most similar to the first query token vector, setting the respective query score to the greatest similarity measure value between the first query token vector and any of the document token vectors that are in the set of document token vectors that are most similar to the first query token vector;

for a second query token vector, determining that none of the document token vectors that represent the candidate document are in the set of document token vectors that are most similar to the second query token vector;

in response to determining that none of the document token vectors that represent the candidate document are in the set of document token vectors that are most similar to the second query token vector, setting the respective query score to an imputed value; and combining the respective query scores to generate the respective relevance score for the candidate document;

selecting, as relevant documents to the query, a subset of the set of candidate documents using the respective relevance scores; and providing, in response to the query, data identifying the relevant documents to the query.

14. The system of claim 13, wherein the imputed value is the least similarity measure value between the second query token vector and any of the document token vectors in the set of document token vectors that are most similar to the second query token vector according to a similarity measure.

15. The system of claim 13, wherein combining the respective query scores to generate the respective relevance score for the candidate document comprises:

summing the respective query scores; and dividing the sum by the number query scores.

16. The system of claim 13, wherein selecting, as relevant documents to the query, the subset of the set of candidate documents using the respective relevance scores comprises:

selecting the subset of the candidate documents with the largest relevance scores.

17. The system of claim 13, the operations further comprising:

obtaining a training dataset comprising training batches each comprising a training query and a plurality of training documents;

for each training batch, processing the training query using the query encoder neural network to generate a plurality of training query token vectors;

processing the training documents using a document encoder neural network to generate a plurality of training document token vectors;

for each of the plurality of training query token vectors, identifying a set of training document token vectors that are most similar to the training query token vector according to a similarity measure;

identifying a set of candidate training documents that includes each training document represented by one or more training document token vectors from the respective sets of training document token vectors for the plurality of training query token vectors;

generating a respective relevance score for each of the candidate training documents, comprising:

generating a respective query score for each training query token vector, comprising:

for a first training query token vector, determining whether one or more of the training document token vectors that represent the candidate training document are in the set of training document token vectors that are most similar to the first training query token vector; and in response to determining that one or more of the training document token vectors that represent the candidate training document are in the set of training document token vectors that are most similar to the first training query token vector, setting the respective query score to the greatest similarity measure value between the first training query token vector and any of the training document token vectors that are in the set of training document token vectors that are most similar to the first training query token vector; and combining the respective query scores to generate the respective relevance score for the training candidate document;

evaluating an objective function using the relevance scores of each training batch; and training the query encoder neural network and the document encoder neural network to optimize the objective function.

18. One or more non-transitory computer storage media storing instructions that when executed by one or more computers cause the one more computers to perform operations comprising:

maintaining data associating each of a plurality of documents with a respective plurality of document token vectors representing the document;

obtaining a query;

processing the query using a query encoder neural network to generate a plurality of query token vectors;

for each of the plurality of query token vectors, identifying a set of document token vectors that are most similar to the query token vector according to a similarity measure;

identifying a set of candidate documents that includes each document represented by one or more document token vectors from the respective sets of document token vectors for the plurality of query token vectors;

generating a respective relevance score for each of the candidate documents, comprising:

generating a respective query score for each query token vector, comprising:

for a first query token vector, determining that one or more of the document token vectors that represent the candidate document are in the set of document token vectors that are most similar to the first query token vector; and in response to determining that one or more of the document token vectors that represent the candidate document are in the set of document token vectors that are most similar to the first query token vector, setting the respective query score to the greatest similarity measure value between the first query token vector and the document token vectors that are in the set of document token vectors that are most similar to the first query token vector;

for a second query token vector, determining that none of the document token vectors that represent the candidate document are in the set of document token vectors that are most similar to the second query token vector;

in response to determining that none of the document token vectors that represent the candidate document are in the set of document token vectors that are most similar to the second query token vector, setting the respective query score to an imputed value; and combining the respective query scores to generate the respective relevance score for the candidate document;

selecting, as relevant documents to the query, a subset of the set of candidate documents using the respective relevance scores; and providing, in response to the query, data identifying the relevant documents to the query.

19. One or more non-transitory computer storage media of claim 18, wherein the imputed value is the least similarity measure value between the second query token vector and the document token vectors in the set of document token vectors that are most similar to the second query token vector according to a similarity measure.

20. One or more non-transitory computer storage media of claim 18, wherein combining the respective query scores to generate the respective relevance score for the candidate document comprises:

summing the respective query scores; and dividing the sum by the number query scores.

* * * * *